United States Patent [19]
Mäkelä et al.

[11] Patent Number: 5,535,786
[45] Date of Patent: Jul. 16, 1996

[54] METHOD FOR REPAIRING FLOW CONDUITS, AND REPAIR MATERIAL

[75] Inventors: Seppo Mäkelä, Mynämäki; Seppo Järvinen, Turku; Mikko Karttunen; Esa Suokas, both of Tampere, all of Finland

[73] Assignee: Suomen Putkisaneeraus Oy, Turku, Finland

[21] Appl. No.: 315,184

[22] Filed: Sep. 29, 1994

Related U.S. Application Data

[63] Continuation of Ser. No. 937,856, Oct. 28, 1992, abandoned.

[30] Foreign Application Priority Data

Apr. 6, 1990 [FI] Finland ................................ 901744

[51] Int. Cl.⁶ .................................................... F16L 55/16
[52] U.S. Cl. ......................... 138/98; 405/150.1; 264/269; 156/287
[58] Field of Search ................................ 138/97, 98, 123, 138/124, 125, 126, 137; 405/150, 154, 150.1, 153, 151; 264/36, 269; 156/287

[56] References Cited

U.S. PATENT DOCUMENTS

| | | | |
|---|---|---|---|
| 427,929 | 5/1890 | Stowe | 138/124 |
| 1,396,789 | 11/1921 | Short | 138/124 |
| 1,589,438 | 6/1926 | Short | 138/124 |
| 4,025,684 | 5/1977 | Neidhardt | 138/124 |
| 4,602,974 | 7/1986 | Wood et al. | 264/269 |
| 4,714,095 | 12/1987 | Müller et al. | 138/98 |
| 4,724,178 | 2/1988 | Hyodo et al. | 138/98 |
| 4,778,553 | 10/1988 | Wood | 138/98 |
| 4,865,673 | 9/1989 | Shishkin et al. | 138/98 |
| 4,877,665 | 10/1989 | Higuchi et al. | 138/98 |
| 4,976,290 | 12/1990 | Gelin et al. | 138/98 |
| 5,029,615 | 7/1991 | Müller et al. | 138/98 |
| 5,030,493 | 7/1991 | Rich | 138/97 |
| 5,077,107 | 12/1991 | Kanedo et al. | 138/98 |
| 5,273,080 | 12/1993 | Morohashi et al. | 139/388 |

FOREIGN PATENT DOCUMENTS

| | | |
|---|---|---|
| 2235723 | 9/1990 | Japan . |
| 2085112 | 4/1982 | United Kingdom . |
| WO91/15707 | 10/1991 | WIPO . |

*Primary Examiner*—James E. Bryant III
*Attorney, Agent, or Firm*—Schweitzer Cornman & Gross

[57] ABSTRACT

A method for repairing flow conduits, such as pipe lines, wherein the inner surface of a conduit is provided with a flexible material, including a curing agent as well as a reinforcement layer, and the curing agent is hardened, the reinforcement layer comprising a knitted fabric, wherein the knitted fabric comprises reinforcement filaments which are separate from a fabric-forming yarn and extend inside the knitted fabric substantially in a single direction.

4 Claims, 1 Drawing Sheet

METHOD FOR REPAIRING FLOW CONDUITS, AND REPAIR MATERIAL

CROSS REFERENCE TO RELATED APPLICATION

This is a continuing application of U.S. Ser. No. 937,856, filed on Oct. 28, 1992, now abandoned, is the national phase of PCT/FI91/00102, filed on Apr. 5, 1991.

FIELD OF THE INVENTION

The present invention relates to a method for repairing flow conduits, such as pipe lines, as well as to a material for carrying out the above method.

BACKGROUND OF THE INVENTION

The repair work of old, deteriorated pipe lines with a purpose of fixing cracks and fissures developed in the pipes is currently generally effected by using a flexible material to be laid on the inner surface of pipes, said material including a curing agent as well as a necessary reinforcement layer for providing strength. Such material is generally laid in underground pipe lines from above the ground as a long tubular sleeve in a manner that the pipes need not be dug up. Such a method is known e.g. as "Insituform" or "Paltem" and it is in a wide-spread use.

The material inserted inside a pipe line is required to have a particularly good flexibility, plasticity and strength and, thus, it has been difficult to find proper materials. In addition, since pipes come in varying sizes and often include sharp bends, flexibility and plasticity are particularly important factors in a lining and repair material.

SUMMARY OF THE INVENTION

An object of the invention is to provide a method which is capable of achieving further improved results in pipe-line repair work. By virtue of a reinforcement layer provided by a knitted fabric, the method is highly reliable as a result of the flexibility, plasticity and strength of a repair material employed.

On the other hand, a material for carrying out the invention is characterized by what a knitted fabric having a plurality of reinforcing filaments disposed substantially parallel to each other within the fabric and a plurality of reinforcing filaments extending inside the knitted fabric substantially in a peripheral direction which is capable of providing the above properties, which are desirable in association with pipe-line repair materials. The material includes a felt layer, preferably consisting of fibres and having a knitted fabric fastened thereto. Thus, the felt can be used e.g. for absorbing a curing agent into the material. A high strength, both horizontally and in depth of the material, is obtained by binding felt layer and material together by needling. The knitting can be of any prior known type, e.g. a smooth knit, a lining knit or an interlock knit. According to one preferred embodiment, such a knitted fabric includes individual filaments of a yarn forming continuous hitting loops, the knitted fabric is in this case manufactured by laying-in technique.

DESCRIPTION OF THE DRAWING

The invention will now be described in more detail with reference made to the accompanying drawing, in which.

DETAILED DESCRIPTION

Figure 1:
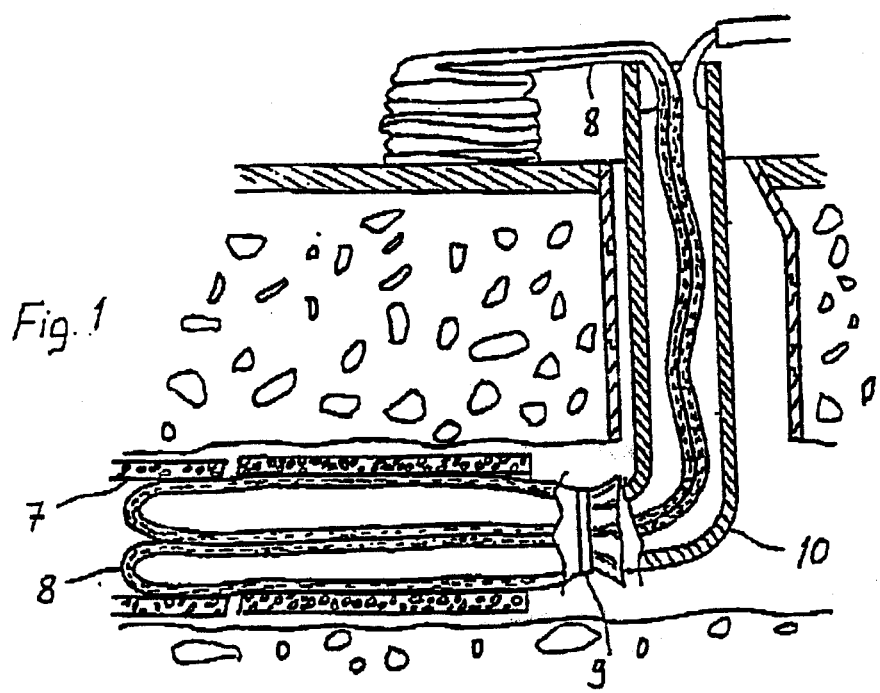
FIG. 1 shows the principle of a method of the invention.

FIG. 1 illustrates the main principle of a method of the invention. Into an underground flow conduit 7, such as e.g. a water supply line, a sewage pipe or a gas line, is inserted a tubular continuous sleeve 8 in a manner that its one open end is clamped by means of a collar or a like 9 around the mouth of a special guide tube 10. The sleeve advances through the guide tube in a manner that its outer surface to be laid against the actual pipe to be lined serves as an inner surface inside the guide tube, i.e. in a way the sleeve is turned inside out. This is followed by using a medium, such as a gas or a fluid, to advance said sleeve 8 into the interior of a pipe 7 to be repaired and, as a result of its plasticity or compliance, the tubular sleeve presses its outer surface against the inner walls of pipe 7. Towards the final stage, the sleeve will lie over its entire length inside a pipe section of the corresponding length as a tubular member to surround the inner periphery of a pipe line in the cross-sectional direction of said pipe, whereafter said sleeve 8 is cured or hardened by applying heat thereto, e.g. by passing hot water or gas inside the sleeve. The curing into a pipe-sealing inner layer occurs by virtue of a heat-setting resin, such as e.g. epoxy resin or unsaturated polyester, contained in the sleeve.

Figure 2:
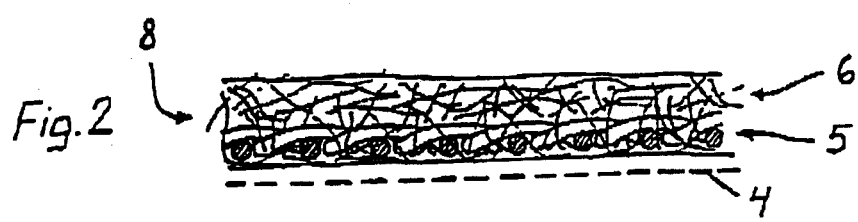
FIG. 2 shows a lining material of the invention in a sectional view perpendicular to its plane.

FIG. 2 illustrates the structure of a lining material of the invention. The material 8 comprises a felt 6 which is a non-woven felt consisting of fibres. The felt layer 6 and a knitted fabric 5 are fastened together preferably by needling, i.e. said felt layer 6 and knitted fabric 5 are fixed together mechanically during the course of needling by means of the felt layer fibres, which are attached to the fibres of knitted fabric 5. A felt layer can also be produced in a manner that the fibres are fed as a carded mat on top of the knitted fabric, followed by needling.

Figure 3:
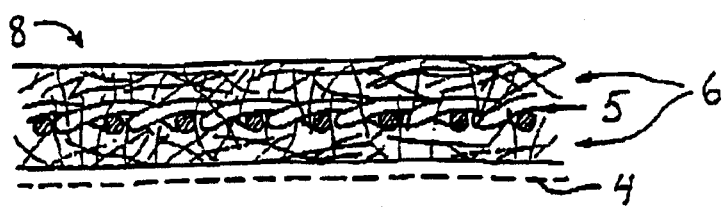
FIG. 3 shows a lining material according to a second alternative.

FIG. 3 illustrates yet a third structure with a knitted fabric 5 inside a felt layer. This can be provided e.g. by needling two felt layers on the opposite sides of a knitted fabric 5.

Figure 4:
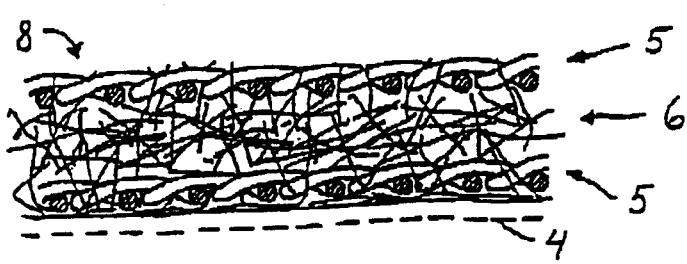
FIG. 4 shows a lining material according to a third alternative.

FIG. 4 illustrates another structure, wherein a felt layer 5 lies between two knitted fabrics 5. This structure can be manufactured as described above.

The use of a knitted fabric as a reinforcement for material 8 offers a major benefit because of the excellent compliancy of a knitted fabric and, thus, the composite material complies well in sharp bends and curves when used as described above. In addition, a knitted fabric has good strength characteristics.

As used throughout the specification and the claims, the term "knitted" as applied to fabrics, means a fabric prepared by forming interlacing yarns or threads in a series of connected loops.

The material further includes a thin surface layer 4 which is laid on the face of a composite material and is shown with dash-dot-lines in FIGS. 2–4. The relative position of felt layer 6 and knitted fabric 5 should be such that the felt layer forms the outer surface of a composite material for applying said surface or coating layer 4 thereon e.g. by injection. Thus, the coating layer material cannot penetrate into the knitted fabric in a fashion interfering with its function. In the case of FIG. 2, for example, the needling depth can be adjusted to be such that the felt layer fibres form the outer material surface also on its face towards a knitted fabric 5. Layer 4 can be a prior known material used in similar materials, such as polyurethane, which is facing towards the interior of a flow conduit to insulate the other layers therefrom.

A heat-setting resin, such as epoxy resin or unsaturated polyester resin, can be absorbed in the material, e.g. just prior to its application, by impregnating felt layer 6 and knitted fabric 5 with such agent.

The material of felt layer 6 comprises preferably thermoplastic fibres, most preferably discontinuous fibres. In terms of their properties, the polyester fibres are particularly suitable for a felt materialIt is also possible to employ mineral fibres, such as glass fibres.

Figure 5:
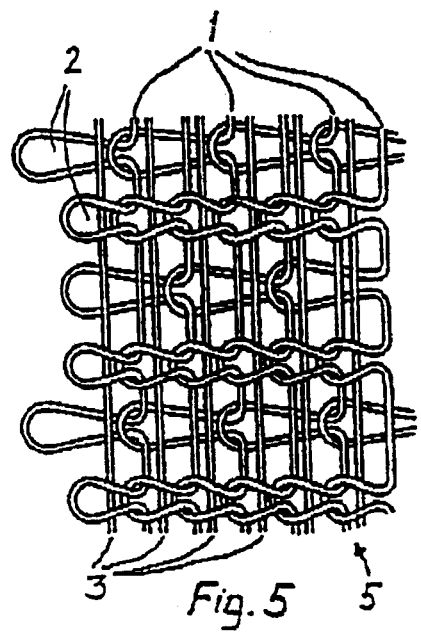
FIG. 5 shows one preferred type of knitted fabric which is manufactured by laying-in technique and which can be used in a lining material of the invention.

FIG. 5 illustrates a knitted fabric which is particularly suitable far use in a material of the invention as a reinforcement. The knitted fabric is of a type manufactured by the application of so-called laying-in technique, i.e. it includes reinforcement filaments 3 which are separate from a fabric-forming yarn 1 and extend substantially in a single direction inside the knitted fabric. The reinforcement filaments 3 extend in a direction perpendicular to the direction of the fabric loop slots and will extend in peripheral direction in a finished tubular lining material in order to obtain radial strength. Filaments 3 can be mono- or multi-filaments, e.g. of polyester or glass fibre.

The knitted fabric shown in FIG. 5 is of an interlock or double-knitting type, wherein the reinforcement filaments extend in a mutually parallel relationship through oppositely placed loops 2 perpendicularly to the direction of loop slots. An interlock type of knitted fabric is indeed a preferred type of knitting for the invention. The knitting yarn comprises unthreaded multifilament, preferably polyester or or glass. This type of knitting provides a particularly good compliancy.

A material of the invention can be manufactured with normal knitting and felt-forming machines and the joining of knitted fabric 5 and felt layer 6 can be effected by the application of normal needling technique. A tubular sleeve formed by the repair material can be manufactured e.g. by seaming together the side edges of a flat, continuous blank which comprises felt 6 and knitting 5. The sleeve can also be manufactured by first forming a knitted fabric with a circular knitting machine, whereafter a sleeve formed by the knitted fabric and a felt layer or layers are driven together in a manner that the sleeve is in flat condition at the time of joining, whereafter the resulting flat material is seamed together by its side edges to form a finished sleeve. Thus, such a product comprises a layer consisting of two superimposed knittings.

The invention as described above is not limited only to the embodiments explained in the specification and shown in the drawings but modifications can be made thereto within the inventive concept defined in the annexed claims. The method can be applied in connection of repair operations of all types of pipe lines and the material employed can also comprise other materials than the above-described sleeve. This relates primarily to pieces or elements of varying shapes and sizes formed of a material blank having an equal thickness, generally a thickness of at least 4–5 mm, said elements being intended for patching possible leakages in pipe lines. This can be done by using all sorts of suitably cut elements or also shorter tubular elements which are inserted inside a pipe to be repaired and, thus, it is possible to utilize the strength, elongation and compliancy of a composite material. Due to its special characteristics, however, a fluid is particularly well suitable for use as a reinforcement in a long tubular repair material as said special characteristics thereof will be put to best possible use in this context.

We claim:

1. A method for repairing a flow conduit having an interior limited by an interior surface, comprising
   (A) inserting into the conduit a tubular flexible element containing
      (i) a curing agent,
      (ii) a reinforcing layer, said reinforcing layer comprising
         (a) a knitted fabric formed of a yarn forming loops, and
         (b) a plurality of reinforcing filaments disposed substantially parallel to each other within the knitted fabric,
      (iii) a fibrous felt layer of fibers and having said curing agent absorbed therein before the insertion of said tubular flexible element into the flow conduit, said reinforcing filaments being separate from said yarn and from the fibers of said fibrous felt layer, said reinforcing filaments extending inside said knitted fabric substantially in a single, peripheral direction around said tubular flexible element, said fibers forming an outer surface of the fibrous felt layer,
      (iv) a surface layer of the tubular flexible element over the outer surface of the fibrous felt layer,
   (B) covering the entire interior surface of said flow conduit with said tubular flexible element so that said surface layer faces toward the interior of the flow conduit, and
   (C) hardening the curing agent.

2. The method of claim 1, wherein the tubular element is clamped at one end thereof to a guide tube, and said tubular element is applied to the inner surface of the conduit by applying pressure by a fluid medium into the flow conduit from an end of said flow conduit.

3. A tubular, flexible element for repairing flow conduits, comprising
   (i) a reinforcing layer of a
      (a) a knitted fabric formed of a yarn forming loops, and
      (b) a plurality of reinforcing filaments extending substantially parallel to each other within the knitted fabric, and
   (ii) a fibrous felt layer of fibers, said reinforcing filaments being separate from said yarn and from the fibers of said fibrous felt layer, said reinforcing filaments extending inside said knitted fabric substantially in a single, peripheral direction around said tubular flexible element, said fibers forming an outer surface of the fibrous felt layer.

4. The material of claim 3, wherein said knitted fabric, and said layer of felted fibers are fastened together by needling.

* * * * *